United States Patent [19]

Morio et al.

[11] 3,716,665

[45] Feb. 13, 1973

[54] COLOR TELEVISION RECEIVER

[75] Inventors: Minoru Morio, Tokyo; Koichiro Mima, Kanagawa-ken, both of Japan

[73] Assignee: Sony Corporation, Tokyo, Japan

[22] Filed: June 15, 1971

[21] Appl. No.: 153,363

[30] Foreign Application Priority Data

Nov. 17, 1970 Japan ..............................45/101285

[52] U.S. Cl. ................................................178/5.4 P

[51] Int. Cl. ................................................H04n 9/02

[58] Field of Search........178/5.4, 5.4 P, 5.4 S, 5.4 C, 178/5.4 CD, 5.4 SD

[56] References Cited

UNITED STATES PATENTS

| | | | |
|---|---|---|---|
| 3,597,530 | 8/1971 | Hartwich | 178/5.4 P |
| 3,548,091 | 12/1970 | Bockwoldt | 178/5.4 CD |
| 3,449,510 | 6/1969 | Steinkopf | 178/5.4 C |

*Primary Examiner*—Richard Murray
*Attorney*—Lewis H. Eslinger et al.

[57] ABSTRACT

In a decoding system to receive PAL television signals, two synchronous demodulators are used, each connected to its own reference signal source. Both demodulators are connected to one pole of a switching circuit equivalent to a double-pole-double-throw switch and one oscillator control circuit is connected to the same pole to be controlled by corresponding burst signals. The other oscillator control circuit is connected to the other pole of the switching circuit to receive alternative burst signals. The oscillations supplied to the demodulators may both have the same phase as the burst signals or, by vector addition, one may be modified to correspond to a chrominance component modulation axis. As a further alternative, both oscillations may be selectively combined to be fed to the demodulators in the proper axes for color difference signal demodulation.

12 Claims, 20 Drawing Figures

INVENTOR
MINORU MORIO
BY KOICHIRO MIMA
Lewis H. Eslinger

INVENTOR.
MINORU MORIO
KOICHIRO MIMA
BY Lewis H. Eslinger

INVENTOR.
MINORU MORIO
BY KOICHIRO MIMA
Lewis H. Eslinger

INVENTOR.
MINORU MORIO
KOICHIRO MIMA
BY
Lewis H. Eslinger

INVENTOR.
MINORU MORIO
BY KOICHIRO MIMA

INVENTOR
MINORU MORIO
KOICHIRO MIMA
BY Lewis H. Eslinger

COLOR TELEVISION RECEIVER

BACKGROUND OF THE INVENTION

1. Field of the Invention

This invention relates to color television receivers adapted to receive signals transmitted in accordance with the phase alternation by line system commonly referred to as the PAL system. In particular, the invention relates to a decoding system for use in a color television receiver to receive signals transmitted according to the PAL system.

2. The Prior Art

In the PAL system two color difference components containing chrominance information are simultaneously encoded by suppressed-carrier quadrature amplitude modulation on a color sub-carrier within the video frequency band. If there is any phase distortion in the transmission path between the encoder at the television station and the demodulators at the receiver, this phase distortion is likely to remain reasonably constant for a period of time much longer than a television line interval. The hue of the television image reconstructed by the receiver from the received signal is determined by the phase angle of the chrominance signal and is, therefore, adversely affected by phase distortion unless it is cancelled out. The PAL system effects cancellation of the phase error by reversing the color sequence at the end of each line. Information as to the color sequence of each line is encoded in the phase of the burst signal preceding that line by shifting the phase of the burst signal 90° forward for one line and 90° back for the next line. Phase distortion that would tend to make the image shift toward the blue end of the color spectrum for one color phase sequence presented during one line will still produce the same phase error in the succeeding line. However, because of the difference in phase sequence between the initial line and the succeeding line, this phase error now shifts the hue toward the red end of the spectrum. Assuming reasonably constant luminance and recognizing the fact that the information in one television line is very little different from that in the next line, the two shifts in hue, one in the blue direction and the other in the red direction, tend to cancel each other out.

In the so-called simple PAL receiver, this cancellation is obtained by visual averaging of the line, but this tends to produce an effect known as a line crawling "-Venetian blind" pattern. It is also possible in a more complex PAL receiver to average out the errors by delaying the chrominance signal by exactly one line interval of time and then combining the delayed signal with the signal for the next scanning line. This substantially eliminates the spurious Venetian blind line patterns at the price of reduced vertical chrominance resolution and at the further price of greatly increasing the complexity of the receiver.

Although the PAL system eliminates phase shift errors that produce a change in hue, it also makes it impossible to change hue deliberately by means of a hue control. Such change is sometimes desirable to correct for effects having nothing to do with phase error.

A co-pending application, Ser, No. 90,904, filed Nov. 19, 1970, entitled COLOR TELEVISION RECEIVER, and assigned to the assignee of the present application discloses a novel system for decoding PAL color television signals in such a way as to avoid some of the limitations inherent in existing PAL decoders. The aforesaid novel system also is theoretically capable of receiving signals transmitted either on the PAL system or on the so-called NTSC system used in the United States, although the actual sub-carrier frequencies used in these two television systems makes it impossible to take advantage of this latter feature.

The encoding system of the co-pending application includes a switching circuit and delay means connected to receive the incoming chrominance signal. This chrominance signal is first transmitted directly to the demodulators, for one interval of time, and then the same information, delayed one line interval of time, is again transmitted through switching circuit to the demodulators for the next line interval. The chrominance information transmitted from the television station during the second line interval is not used by the receiver. The signal transmitted during the third line interval is passed, undelayed, to the demodulators and is repeated, in delayed form, during the fourth line interval of time.

SUMMARY OF THE INVENTION

Another co-pending application, Ser. No. 152,255, filed June 11, 1971 entitled COLOR TELEVISION RECEIVER , and assigned to the assignee of the present application, discloses an improved decoding system utilizing separate switching means and an inverter to obtain burst signals, or inverted replicas thereof, to control one of the sub-carrier generators to produce a reference sub-carrier signal of the proper phase for one of the demodulators. The reference sub-carrier signal for the other demodulator is produced by controlling a separate oscillator by means of each successive burst signal and depending on integration, or averaging, and, if necessary, inversion to produce a second reference sub-carrier signal of the proper phase separated by 90° from the phase of the first reference sub-carrier signal. In each of the embodiments in that application, every successive burst signal is used to achieve the proper control and the proper phase angle of the reference sub-carrier signals even through, by combined switching and delay means, only half of the chrominance signals are used.

Still another co-pending application, Ser. No. 153,251, filed June 15, 1971, entitled COLOR TELEVISION RECEIVER , and assigned to the assignee of the present application discloses another decoding system in which one of the sub-carrier generators is controlled by bursts derived directly from each line interval of the television signal. This generator integrates the phases of the plus and minus bursts and utilizes a phase inverter to provide a sub-carrier signal to the demodulator in the proper phase to obtain direct demodulation of the blue color difference signals. The generator for the other demodulator derives bursts from the continuous chrominance signal produced by the delay and switching circuits. As a result, all of the burst signals supplied to the second generator have the same phase and, therefore, the signal produced by the generator has the same phase as the burst signals. By using burst signals that accompany the chrominance signals applied to the demodulator that utilizes this reference carrier signal, a demodulated signal is produced that has a modulation axis corresponding to the axis of the burst signal. This demodulated signal must be applied, together with the other demodulated signal and the luminance signal, to a matrix circuit of a type suitable to separate the three primary color signal components.

By adding the reference carrier signal of the phase suitable for demodulating the plus signal to the reference carrier signal having the same phase as one of the burst signals and by controlling the relative amplitudes of the added signals, a second reference carrier signal may be generated with the proper phase to effect direct demodulation of the red color difference signal.

It is one of the principal objects of this invention to provide an improved decoding system that will automatically provide local sub-carriers of different phase to demodulate PAL television signals.

In fulfilling the stated object, the present invention utilizes the transmitted burst signals to control both of the local oscillators that supply demodulation sub-carriers. These burst signals, as well as related chrominance signals, pass through a switching circuit that feeds, alternately, a non-delayed chrominance signal and then a delayed chrominance signal to the burst gate circuits and to the demodulators. The switching circuit is equivalent to a double-pole-double-throw switch with two output terminals so connected that one of the burst gate circuits receives plus chrominance signals and the other receives minus chrominance signals. The resultant signal from one local oscillator may be applied to one demodulator that receives the same phase chrominance signals as the burst signals that control that oscillator. The signal from the other local oscillator may be inverted so as to generate a signal opposite in phase to the oppositely phased burst signals that control the second oscillator. Although these local oscillations have axes different from the phase-quadrature axes, the resultant demodulated signals may be combined with the luminance signal in a suitable matrix circuit to produce the correct primary color signals.

As a further alternative, the oscillations may be added together to correct the axis of one of the local sub-carrier signals or they may be added together with additional phase inversion to correct both axes to simplify the matrix circuit.

DESCRIPTION OF THE PREFERRED EMBODIMENTS

Figure 1:
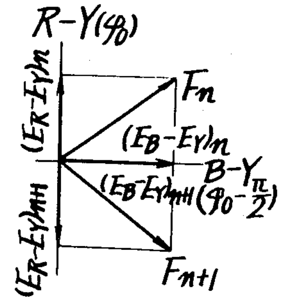
FIG. 1 is a vector diagram for explaining the encoding and decoding of a PAL television system.

The essence of the PAL color television system is in the phase relationship between the two color difference signals modulated on a common sub-carrier to form a chrominance signal. This phase relationship is shown in FIG. 1. One of the chrominance components, $E_B - E_Y$, contains information concerning blue components of the television image. The other, $E_R - E_Y$, contains information relating to red components. Both of these chrominance components are modulated on the same carrier, or more properly the same sub-carrier, but the modulation is performed separately and in such a way that for a given interval of time corresponding to one line of the color television image the carrier on which the chrominance component $E_R - E_Y$ is modulated has a phase $\phi$. During the same interval of time the carrier on which the other chrominance component $E_B - E_Y$ is modulated has a phase $\phi - (\pi/2)$. It is for this reason that the chrominance component $(E_B - E_Y)_n$ representing blue information during a given line interval n (which may be any line in the television image) is represented as a horizontal arrow and the red chrominance component $(E_R - E_Y)_n$ during the same line interval $n$ is represented by a vertical arrow. Vector addition of these two chrominance components produces a resultant signal $F_n$, which is a complex voltage defined by the equation $$F_n = (E_B - E_Y)_n + j(E_R - E_Y)_n.$$

The phase relationship for the following line $n + 1$ is also represented in FIG. 1. In this case, the blue chrominance component for the line $n + 1$ is $(E_B - E_Y)_{n+1}$, which has the same direction as the component $(E_B - E_Y)_n$. However, in accordance with the PAL system, the red chrominance component $(E_R - E_Y)_{n+1}$ is inverted from the chrominance component that characterized the preceding line n. Thus, the equation for the signal $$F_{n+1} \text{ is } F_{n+1} = (E_B - E_Y)_{n+1} - j(E_R - E_Y)_{n+1}.$$

In order to simplify the description of the present invention, the terms "plus" and "minus" will be used in referring to burst and chrominance signals. The term "-plus" will be used to identify those line intervals in which the red color difference component $E_R - E_Y$ has a modulation axis that is vertically upward along the direction $\phi$. During such intervals of time, the vector sum of the chrominance components may be referred to as $F_+$ and is shown in FIG. 1 as being in the first quadrant. The burst signal for the same interval is referred to as $B_+$ and is in the second quadrant. It leads the axis $\phi$ by 45°. During the alternate line intervals, when the modulation axis for the red color component is $-\phi$ and the red color difference signal may be represented as $-(E_R - E_Y)$, the burst signal $B_-$ is in the third quadrant and lags the $-\phi$ axis by 45°. The chrominance signal may be identified as $F_-$ and is in the fourth quadrant.

Figure 2:
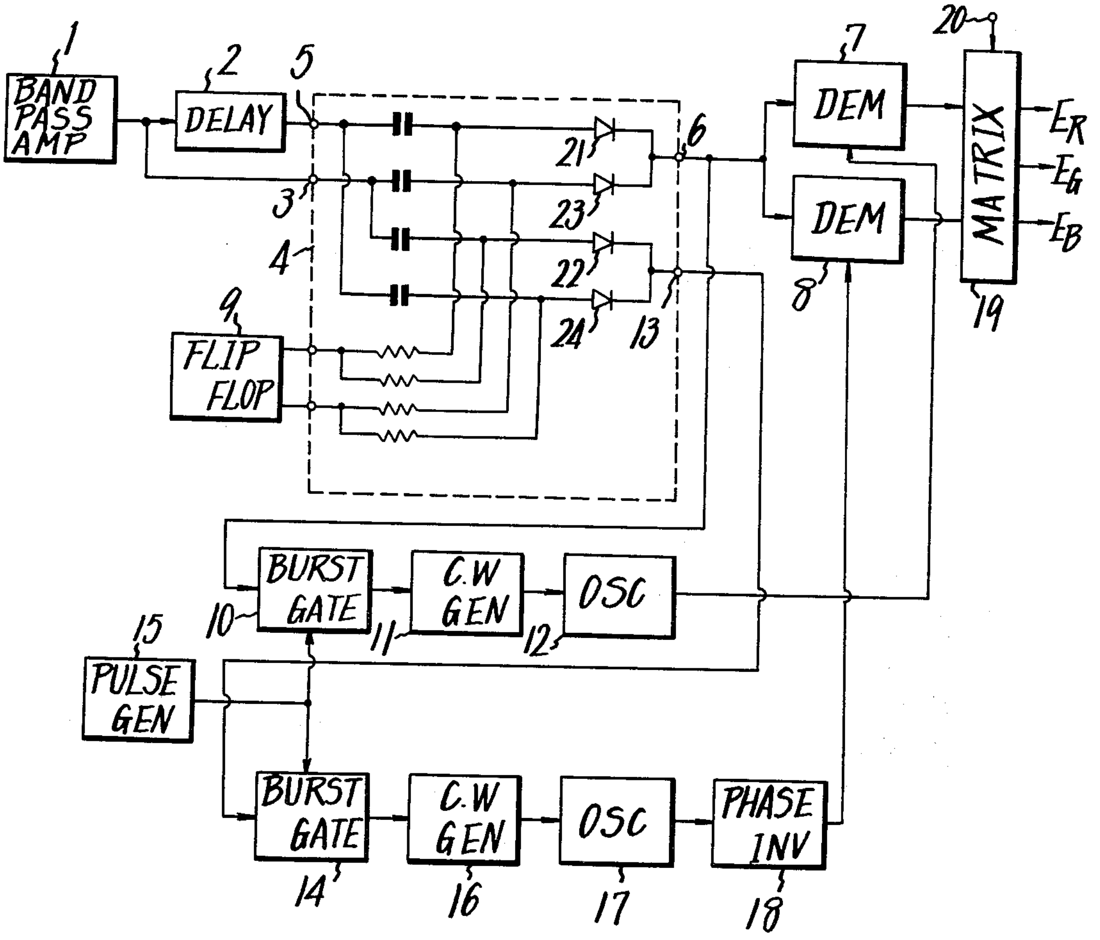
FIG. 2 is a block diagram of one embodiment of a decoding system according to the present invention.

FIG. 2 is a block diagram of a decoding system for use in a color television receiver capable of receiving signals transmitted according to the PAL system and displaying a color television image generated by those signals. The input of the decoding system is at a band pass amplifier 1 which is tuned to transmit the chrominance signals of a composite color television signal. The output of the band pass amplifier 1 is connected to the input of a delay circuit 2 and to one input terminal 3 of a diode switching circuit 4. The output of the delay circuit 2 is connected to a second input 5 of the switching circuit 4, which operates, in effect, as a double-pole-double-throw switch. The switching circuit has an output terminal 6 connected to input terminals of two demodulators 7 and 8 in which the color difference signals are separated from each other. The switching circuit 4 is connected to a flip-flop 9 to have its operation controlled thereby.

The output terminal 6 of the switching circuit 9 is also connected to a burst gate 10. The output of the burst gate 10 is connected, in turn, to a continuous wave generator 11, which may be a crystal oscillator, and the output of the continuous wave generator 11 is connected to an oscillator 12 to control its operation. Signals from the oscillator 12 are connected to the demodulator 7.

The switching circuit 4 has a second output terminal 13 at its other pole, and this terminal 13 is connected to a second burst gate circuit 14. This circuit, and the burst gate circuit 10, are connected to a gate generator 15 to be controlled thereby. The output of the burst gate circuit 14 is connected to a continuous wave generator 16, which may be a crystal oscillator, and the output of the continuous wave generator 16 is connected to an oscillator 17 to control the operation thereof. The output signal from the oscillator 17 is connected in turn to an inverter 18, which supplies signals to the demodulator 8. The outputs of both demodulators 7 and 8 are connected to a matrix circuit 19, and the luminance signal $E_Y$ is also applied to this matrix circuit through an input terminal 20.

Within the switching 4 are four diodes 21–24. Two of the diodes 21 and 22 are connected to one of the output terminals of the flip-flop 9 to be rendered conductive at the same time. The other two diodes 23 and 24 are connected to the other output terminal of the flip-flop circuit 9 to be rendered conductive when the diodes 21 and 22 are non-conductive. The diodes are biased by the output signal of the flip-flop 9 so that, at any given time, one of the output terminals is supplied only with the plus signal $R_+$ and the other is supplied only with the minus signal $F_-$, but whether the terminal 6 is supplied with the plus signal and the terminal 13 supplied with the minus signal, or vice versa, depends on the setting of the switch 4 relative to the signal received by the receiver.

The operation of the circuit in FIG. 2 will be described in conjunction with the phase diagrams in FIGS. 3 and 4. The chrominance signal represented by the sequence $F_n$, $F_{n+1}$, $F_{n+2}$, $F_{n+3}$, . . . is transmitted through the band pass amplifier 1 and is delayed in the delay circuit 2 by one line period of time. The delayed signal, identified by adding a prime to each of the components, is written $F'_n$, $F'_{n+1}$, $F'_{n+2}$, $F'_{n+3}$, . . . and is applied as a continuous signal to the input terminal 5 of the switching circuit 4. The original chrominance signal $F_n$, $F_{n+1}$, $F_{n+2}$, $F_{n+3}$, . . . is also applied directly to the input terminal 3. The signals applied to the terminals 3 and 5 are transmitted through the switching circuit 4 alternately under the control of the flip-flop 9. As a result, the output signal from the terminal 6 of the switching circuit 4 is $F_n$, $F'_n$, $F_{n+2}$, $F'_{n+2}$, . . . The first term, $F_n$, consists of an undelayed signal for one line interval when the terminal 3 is connected through the diode 20 to the output terminal 6. During the next line interval, the flip-flop 9 actuates the switching circuit 4 to cause the diode 23 to be non-conductive and the diode 21 to be conductive to connect the input terminal 5 to the output terminal 6. This causes the same signal to be repeated at the output terminal 6 as $F'_n$. In the third line interval, the switching circuit 4 is returned to the original condition in which the diode 23 is conductive and the diode 21 is non-conductive so that a new undelayed signal $F_{n+2}$ two lines later than the first undelayed signal is transmitted through to the demodulators 7 and 8. In the fourth interval of time, the switching circuit 4 is changed to the alternate condition, in which the output terminal 6 is connected to the input terminal 5, and, because of the delay produced by the circuit 2, the signal $F'_{n+2}$ present during the third interval of time is again transmitted through the terminal 6 to the demodulators 7 and 8. Thus, the demodulators 7 and 8 receive the same signal for two successive line intervals of time and then another signal for the next two line intervals of time, and so on.

If the signals $F_n$, $F_{n+2}$, $F_{n+4}$, . . . happen to be plus signals, $F_+$, and the diode 23 is conductive at the times of arrival of these plus signals, only plus signals will be applied to the demodulators 7 and 8. During the alternate line intervals corresponding to the times of arrival of the signals $F_{n+1}$, $F_{n+3}$, $F_{n+5}$, . . . , which must be minus signals, $F_-$, since the others were plus, the switching circuit 4 is switched to the opposite condition in which the diode 23 is non-conductive and the diode 21 is conductive. As a result, the minus chrominance signals $F_-$ cannot pass through the diode 23. Instead, the delayed $F'_+$ signals, $F'_n$, $F'_{n+2}$, $F'_{n+4}$ . . . , are transmitted through the diode 21, so that only plus signals are sequentially derived, twice each, from the switching circuit 4 in the order $F_n$, $F'_n$, $F_{n+2}$, . . . , and no minus signals are derived therefrom.

Conversely, if at the times of arrival of the plus signals $F_n$, $F_{n+2}$, $F_{n+4}$, . . . , the flip-flop circuit 9 is in its opposite condition, causing reversal of the switching circuit 4 to the condition in which the diode 23 is non-conductive, only minus signals are sequentially derived twice from the switching circuit 4 in the following order: $F_{n+1}$, $F'_{n+1}$, $F_{n+3}$, $F'_{n+3}$, . . . and no plus signals are derived therefrom.

The derivation of the signal to be applied as a carrier to the demodulator 7 begins with the application of the output signal of the switching circuit 4 to the burst gate 10. This output signal is the same chrominance signal that is applied to the demodulators. If this is the plus chrominance signal, $F_+$, *it will have a corresponding plus burst signal*, $B_+$; *if a minus chrominance signal* $F_-$, *it will have a corresponding minus burst signal* $B_-$. *This burst signal, whether* $B_+$ *or* $B_-$, *is separated from the remainder of the signal by the burst gate 10 under control of the gate generator 14. Instead of being derived from each line, this burst signal will be derived only from alternate lines, as* $B_n$, $B_{n+2}$, $B_{n+4}$, . . . and their delayed replicas, $B'_n$, $B'_{n+2}$, $B'_{n+4}$, . . . , and therefore will always have the same phase. Thus, the burst signals will not be averaged to a different phase by the time constant of the continuous wave generator, but the latter will simply produce a signal that has the same phase as the burst signal. In the case of a plus burst signal $B_+$, the output of the continuous wave generator fed to the oscillator 12 produces an output signal $S_1$ which leads the axis $\phi$ by 45° as shown in FIG. 3A.

The burst gate 14 is connected to the other pole, or output terminal, 13 to receive $B_-$ signals at the times the terminal 6 is receiving $B_+$ signals. Therefore, the oscillator 17 produces a signal $S_2$ as shown in FIG. 3A. The inverter 18 inverts the polarity of this signal to produce the signal $S_4$ to be applied to the demodulator 8 as a reference sub-carrier signal.

Figures 3A, 3B, 4A, 4B, 7A, 7B, 8A, 8B:
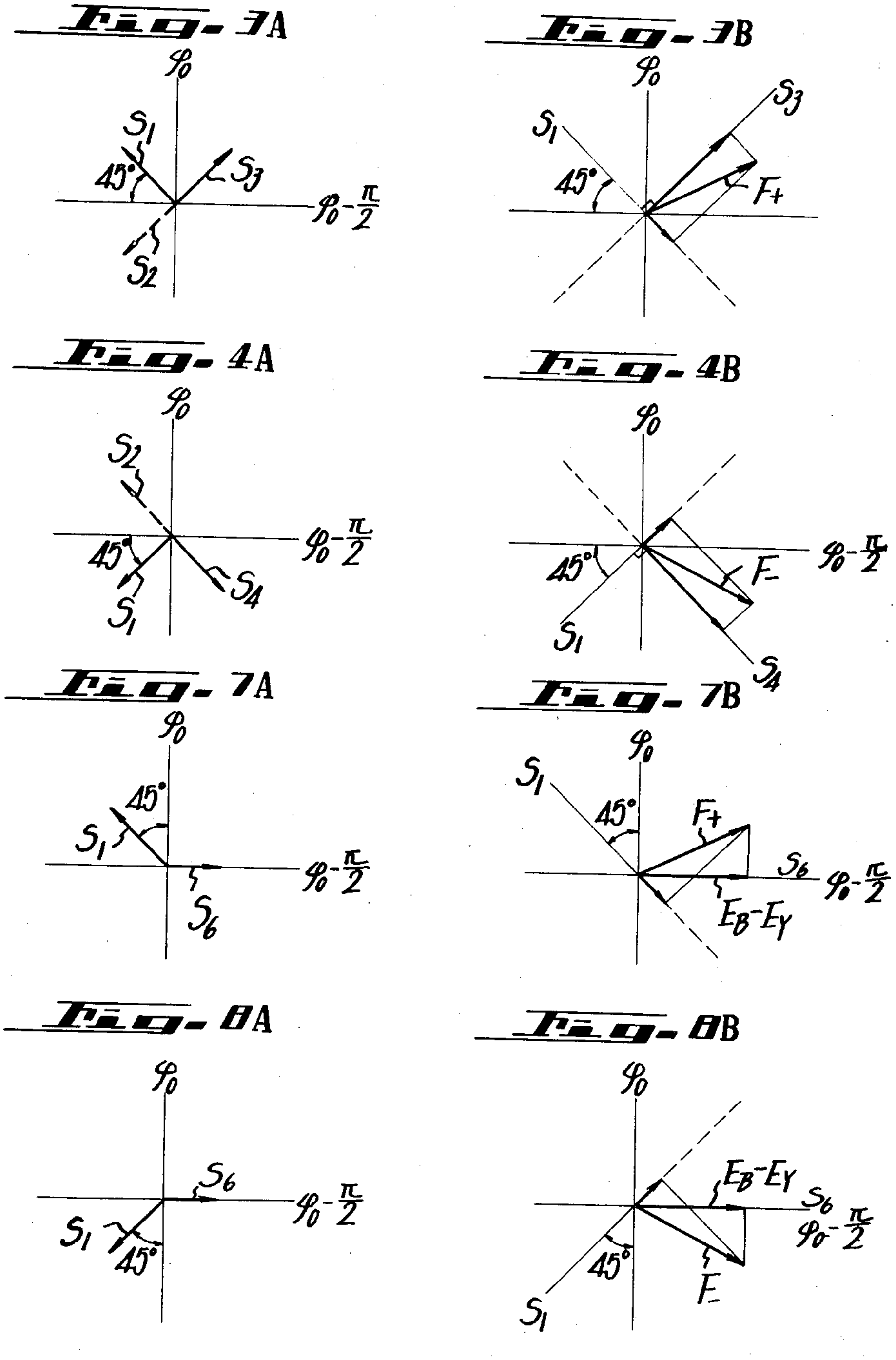
FIGS. 3A and 3B and 4A and 4B are vector diagrams showing the relative phase angles between burst signals, reference sub-carrier signals, and chrominance signals and components thereof.

When the signals $S_1$ and $S_3$ of FIG. 3A are used as reference sub-carriers to demodulate the $F_+$ chrominance signal, as shown in FIG. 3B, the resultant demodulated signals have the same axes as the $S_1$ and $S_3$ signals, rather than the vertical and horizontal axes that would be correct for the red and blue color difference signals. However, when these demodulated signals are applied, together with the luminance signal, to the matrix circuit 19, the three primary color signals $E_G$, $E_R$, and $E_B$ are generated.

If the switching circuit 4 is in the condition to transmit only minus chrominance signals $F_-$ to the demodulators 7 and 8 and burst signals $B_-$ to the burst gate circuit 10, the oscillator 12 will generate the signal $S_1$ shown in FIG. 4A. At the same times, $B_+$ burst signals will be extracted from the terminal 13 and applied to the burst gate 14. The oscillator 17 will then produce the signal $S_2$ shown in FIG. 4A and the signal $S_4$ will be produced by the inverter 18 to be applied as a reference subcarrier signal to the demodulator 8.

FIG. 4B shows the demodulated signal components of the $F_-$ chrominance signal with signals $S_1$ and $S_4$ as the sub-carrier signals. Thus, only one switching circuit is needed, and the polarity of the burst signals is automatically correlated with that of the chrominance signals. As in the case of the $F_+$ signal, the application of these demodulated signals, along with the luminance signal, to the matrix circuit 19 will produce proper primary color signals $E_R$, $E_G$, and $E_B$.

Figure 5:
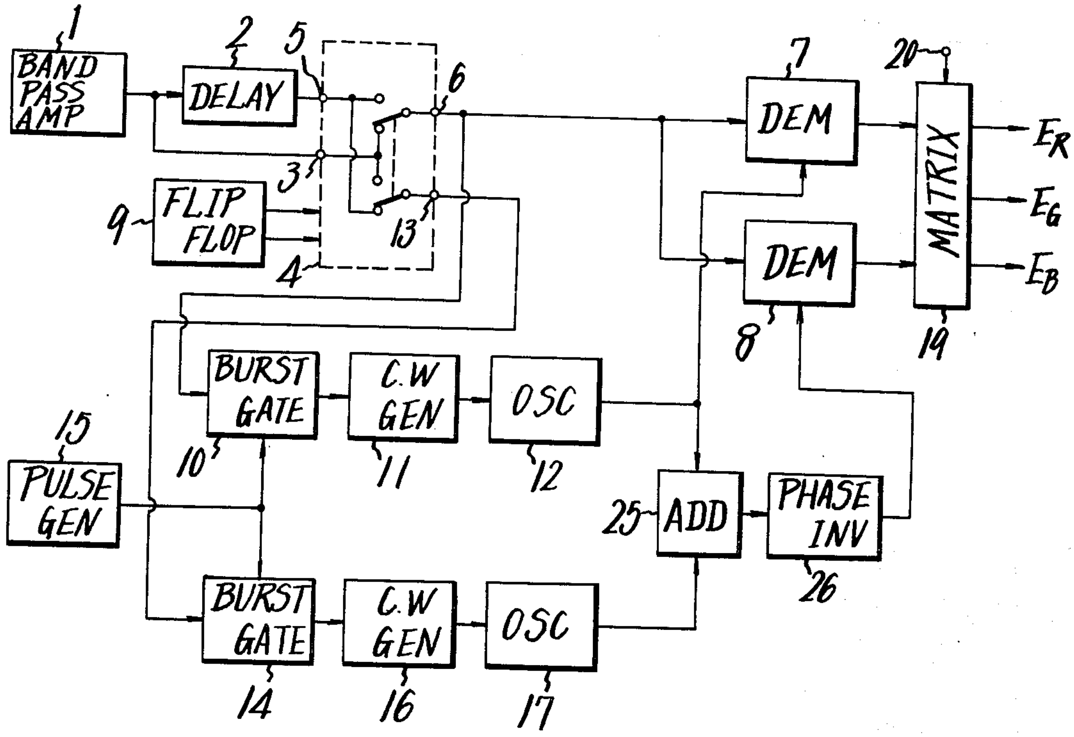
FIG. 5 is a block diagram of a modified embodiment of the present invention.

FIG. 5 shows a further embodiment of the invention utilizing many of the same components as the embodiment in FIG. 2. These include the delay means 2, the switching circuit 4 and the demodulators 7 and 8. The actuation of the switching circuit is controlled by the flip-flop 9. The burst gate 10 is connected to the output terminal 6 of the switching circuit 4 and is connected to the continuous wave generator 11. The other burst gate 14 is connected to the output terminal 13 and transmits burst signals to the continuous wave generator 16. The continuous wave generator 11 is connected to the oscillator 12 and the continuous wave generator 16 is connected to the oscillator 17. The oscillators 12 and 17 are connected to the input terminals of an adding circuit 25. The oscillator 12 is also connected to the demodulator 7. The adding circuit 25 is connected to a phase inverter 26 which is connected to the demodulator 8 to supply carrier signals thereto.

In the operation of the circuit in FIG. 5, either plus chrominance signals $F_+$ or minus chrominance signals $F_-$ will be derived from the switching circuit 4 and applied to both of the demodulators 7 and 8 and to the burst gate 10. Assuming for the moment that the signals are plus chrominance signals $F_+$, they include burst signals $B_+$. These signals pass through the burst gate 10 and control the operation of the continuous wave generator 11 so that it produces a continuous wave having the same phase as the burst signal. This wave is applied to the oscillator 12 to control its operation so that it, also, will produce a signal $S_1$ having the same phase as the burst signal and shown in FIGS. 6 and 7A. This signal is applied to the demodulator 7.

At the same time chrominance signals applied to the other burst gate 14 contain bursts, which cause the phase of the continuous wave generated by the circuit 16 to be the same as the phase of the $B_-$ burst. This wave is applied to the oscillator 17 to cause it to produce a signal $S_2$ shown in FIG. 6 and having the same phase as the $B_-$ burst. When this signal and the signal $S_1$ are vectorially added in the adder circuit 25 and the vector sum is inverted in the phase inverter 26, the resultant is a signal $S_6$ shown in FIGS. 6 and 7A. The phase of the signal $S_6$ is correct for demodulating plus color difference components ($E_B - E_Y$) of the chrominance signal, as shown in FIG. 7B. Although the demodulation axis due to the signal $S_1$ is not $\phi$, the fact that the blue color difference component is correctly demodulated simplifies the operation of the matrix circuit 19.

When the relationship between the incoming signal from the band pass amplifier 1 and the operation of the switching circuit 4 is such that $F_-$ chrominance signals are transmitted to the demodulators 7 and 8 and to the burst gate 10, the operation is depicted by FIGS. 8A and 8B. Under these circumstances, the signal $S_6$ is generated, as before, by the oscillator 12, but the minus burst signal transmitted through the burst gate 10 causes a continuous wave of the same phase as the $B_-$ signal to be generated in the circuit 11 and used to control the oscillator 17 to produce a reference sub-carrier signal $S_4$ that also has the same phase.

As a result of this automatic production of the signal $S_1$ at an angle that leads the $\phi$ axis by 45° or lags the $-\phi$ axis by 45°, depending on whether the chrominance signal is $F_+$ or $F_-$, the demodulated components shown in FIGS. 7B and 8B, respectively, have the correct direction of displacement. The signal $S_6$ automatically has the proper axis $\phi - \pi/2$ to demodulate the blue color difference signals, which simplifies the matrixing operation to produce the signals $E_R$, $E_G$, and $E_B$.

Figure 9:
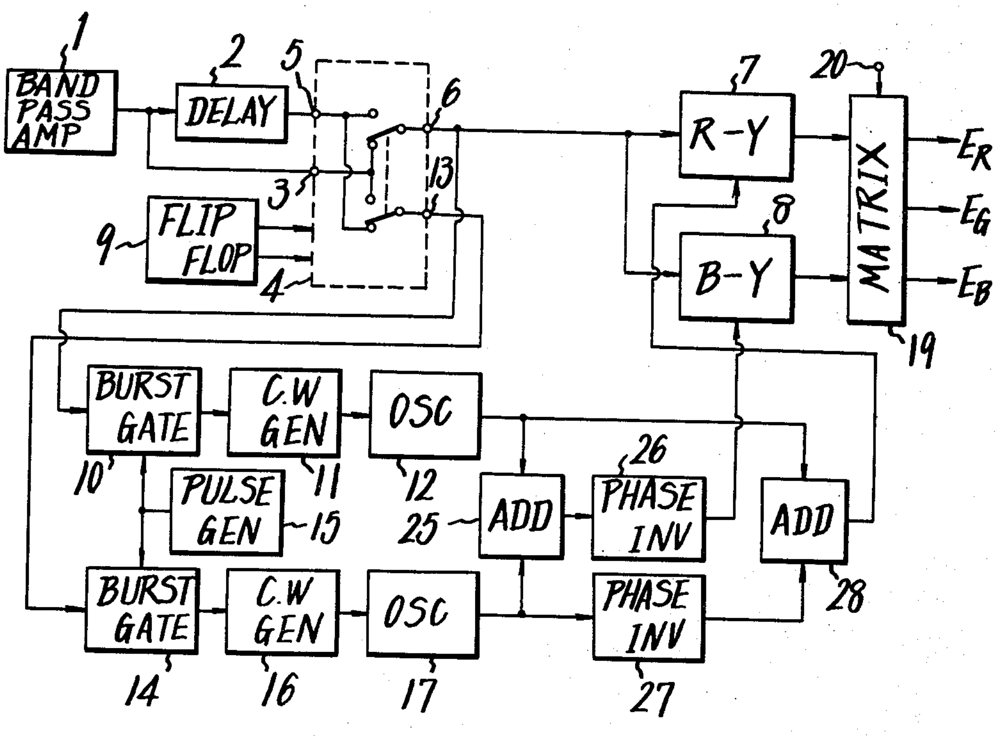
FIG. 9 is a block diagram of another modified embodiment of the invention.

FIG. 9 is a modified embodiment of the invention to provide means for also automatically generating a reference sub-carrier signal of the proper phase to demodulate the red color difference signals. The circuit in FIG. 9 is similar to that in FIG. 5 but includes an additional phase inverter 27 connected to the output of the oscillator 17 and a second adding circuit 28 connected to the output of the phase inverter 27 and the oscillator 12.

As in the circuit shown in FIG. 5, the circuit shown in FIG. 9 generates a reference sub-carrier signal $S_6$ of the same phase as the B − Y axis, $\phi - \pi/2$. This signal is generated no matter whether the $F_+$ or the $F_-$ chrominance signal is fed to the demodulators 7 and 8. However, the reference subcarrier signal to be applied to the demodulator 7 must have the phase $\phi$ for $F_+$ chrominance signals and $-\phi$ for $F_-$ chrominance signals.

Figure 10A:
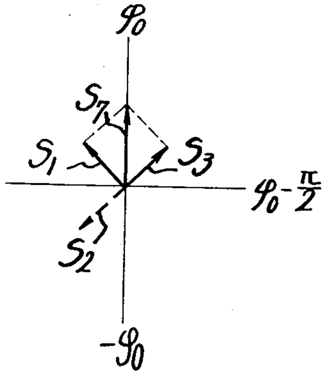
FIGS. 10A, 10B and 11 are vector diagrams for explaining the decoding system shown in FIG. 9.

When $F_+$ chrominance signals are supplied from the terminal 6 to the demodulators 7 and 8, $F_-$ chrominance signals including $B_-$ burst signals are applied to the burst gate 14. These cause the oscillator 17 to generate the signal $S_2$ shown in FIG. 10A. This signal is inverted by the phase inverter 27 to produce the signal $S_3$ shown in FIG. 10A and the vector sum of this signal with the corresponding signal $S_1$ produces a reference sub-carrier signal $S_7$ having the phase $\phi$ for demodulation of the red color difference signals in the demodulator 7.

Figure 10B:
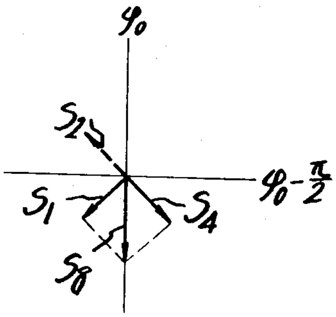
Figure 11:
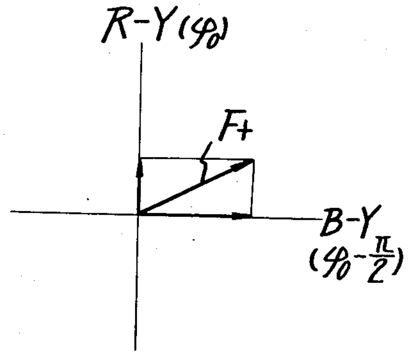
Figure 11:
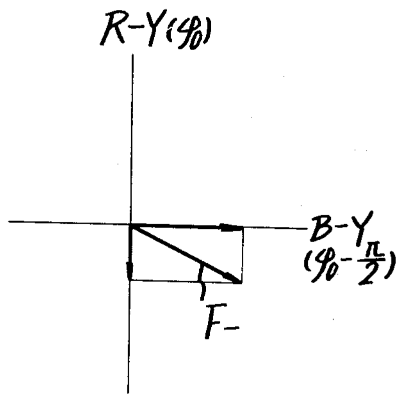

On the other hand, when $F_-$ chrominance signals are applied to the demodulators 7 and 8, $F_+$ chrominance signals including $B_+$ burst signals are derived from the output terminal 13 and applied through the burst gate 14 to the generator 16. As a result, the oscillator 17 produces signals $S_2$ having the phase shown in FIG. 10B. At the same time, the oscillator 12 produces signals $S_1$ having the phase shown in FIG. 10B and when these are added to the output signals $S_4$ from the phase inverter 27, the vector sum is a signal $S_8$ having the phase $-\phi$, which is correct for demodulation of the $F_-$ chrominance signal in the demodulator 7. Thus, the decoding system shown in FIG. 9 includes means for automatic production of reference sub-carrier signals having the correct axes for demodulation of both of the chrominance components, whether for a plus chrominance signal $F_+$ in FIG. 11A or a minus chrominance signal $F_-$ in FIG. 11B. This has the advantage that the matrix circuit 19 is extremely simplified.

Figure 12:
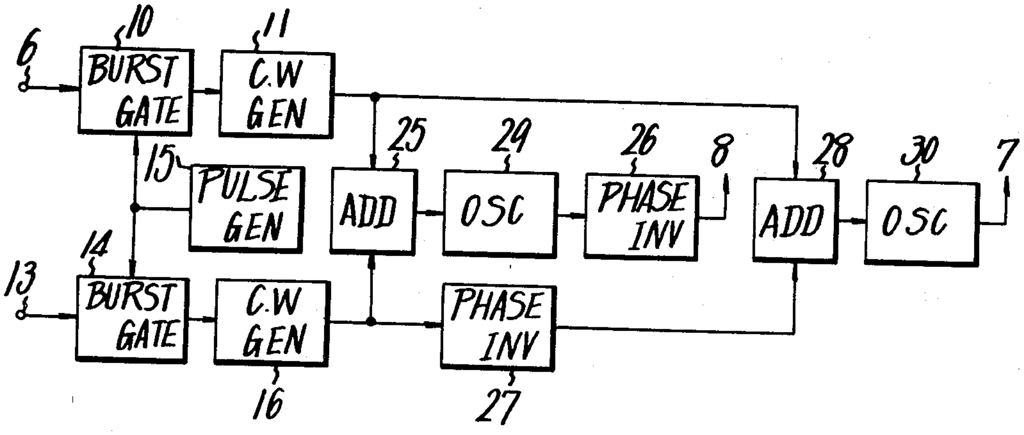
FIG. 12 is a block diagram of still another embodiment of the invention.

Instead of controlling the oscillators directly from the continuous wave generators 11 and 16, the output signals from these generators may be selectively added, with phase inversion where necessary, to produce signals to control the operation of oscillators for generation of reference sub-carrier signals. Such a circuit is shown in FIG. 12 in which the adding circuit 25 is connected directly to the outputs of the continuous wave generators 11 and 16. The output of the adding circuit is connected to an oscillator 29 which in turn is connected to the phase inverter 26. The output of the phase inverter is connected to the demodulator 8. The continuous wave generator 16 is also connected to the phase inverter 27, and this phase inverter and the generator 11 are connected to the adding circuit 28. The output of the adding circuit is connected to an oscillator 30, which is connected in turn to the demodulator 7.

Figure 6:
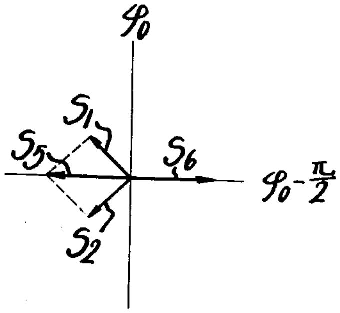
FIGS. 6, 7A, 7B, 8A, and 8B are vector diagrams of signal phase relationships that occur in the operation of the circuit in FIG. 5.

The vector sum of the output signals of the continuous wave generators 11 and 16 is a signal having the phase of the signal $S_5$ in FIG. 6. This signal controls the oscillator 29 to produce an output signal having the same phase and when this output signal is inverted in the phase inverter 26 it produces a reference sub-carrier signal having the phase $S_6$ shown in FIG. 6. This phase is along the axis $\phi - \pi/2$, which is correct for demodulation of blue color difference signals from the chrominance signal. When the output signal of the continuous wave generator 16 is inverted by the phase inverter 27 and added in the adding circuit 28 to the output of the continuous wave generator 11, a control signal is produced that has either the phase of the signal $S_7$ shown in FIG. 10A or the phase $S_8$ shown in FIG. 10B, depending upon whether positive chrominance signals $F_+$ or negative chrominance signals $F_-$, respectively, are being applied to the demodulators 7 and 8. In either case, the signal at the output of the adder circuit 28 causes the oscillator 30 to produce a signal of corresponding phase which is then applied to the demodulator 7 as a reference sub-carrier signal.

In the foregoing description the non-delayed, original chrominance signal and the chrominance signal delayed behind it for one horizontal line interval are utilized alternatively to produce a continuous selected chrominance signal. As an alternative, it is possible to utilize one line of the original chrominance signal and a signal delayed an odd number of times as long as a horizontal line interval. Furthermore, this invention is not limited to producing reference sub-carrier signals along the R - Y and B - Y axes. The invention is also applicable to producing carrier signals for demodulating I and Q signals or the like.

Figure 13:
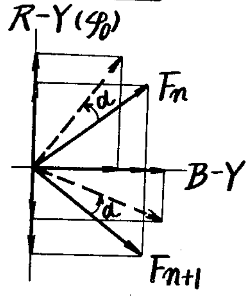
Figure 14:
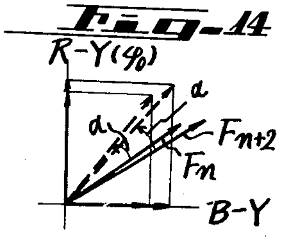

With the present invention, the circuit construction is simple, and there is no deterioration in the quality of the reproduced picture. The receiver employs only the delay circuit 2 and a switching circuit between the band pass amplifier 1 and the demodulators 7 and 8. This is extremely simple in comparison with the so-called standard PAL decoding system. In the simplified PAL decoding system, the signal from the band pass amplifier would be applied directly to the demodulators. When a phase distortion $\alpha$ is present, as shown in FIG. 13, the magnitude of the demodulated color signals of adjacent lines vary in opposite direction, and the saturation difference between the color signals of adjacent lines becomes great enough to cause deterioration in the quality of the reproduced picture. With the present invention, however, there is no difference in saturation between adjacent lines of the same signal. In addition, the difference in saturation caused by the phase distortion $\alpha$ between adjacent lines of different signals is too small to produce any deterioration in the quality of the reproduced picture. This is clear from the vector diagram in FIG. 14.

Further, in accordance with the present invention, two reference signals are produced. One of these has the same phase as selected burst signals that correspond to one line interval of time in which the modulation axis for one color signal has one phase. The other reference signal is a signal opposite in phase to the integrated burst signals for each of the line intervals. These signals are produced by the extraction, first, of a non-delayed chrominance signal and then the extraction of a chrominance signal delayed for one horizontal scanning interval or an odd number of scanning intervals. The sub-carrier signals to be used in demodulating the chrominance signals are produced under the control of the aforesaid reference signals. Consequently, the chrominance signals applied to the demodulators can always be demodulated with sub-carrier signals of predetermined phases irrespective of the alternate extracting operation of the non-delayed signal and the delayed signal. Furthermore, this extraction need not be controlled, which permits further simplification of the circuit construction of the present invention.

What is claimed is:

1. A decoding system for a color television receiver adapted to receive and display the luminance and chrominance signal components of a color television signal transmitted in accordance with a phase alternation by line system, said decoding system comprising:

A. Means for separating said chrominance signal from said color television signal;
B. Delay means for delaying said chrominance signal for substantially one line period;
C. Circuit means for extracting the delayed chrominance signal and the non-delayed chrominance signal alternately every other line period and producing a first and second continuous chrominance signals;
D. First and second demodulator means for demodulating at least one of said continuous chrominance signals;
E. First and second generating means for producing first and second reference signals, said first and second generating means being connected, respectively, to said first and second demodulator means to supply said reference signals thereto for demodulating said continuous chrominance signals;
F. First supplying means for supplying a burst signal in said first continuous chrominance signal to said first generating means to control the phase of said first reference signal; and
G. Second supplying means for supplying a burst signal in said second continuous chrominance signal to said second producing means to control the phase of said second reference signal.

2. The decoding system of claim 1 in which said first supply means controls the phase of said first reference signal to be the same as the phase of the burst signal in said first continuous chrominance signal, and said second supply means controls the phase of said second reference signal to be the same as the phase of the burst signal in said second continuous chrominance signal.

3. The decoding system of claim 1 in which said circuit means comprises a switching circuit having:

A. A first input terminal connected to a source of said chrominance signal;
B. A second input terminal connected to said delay means to receive a delayed replica of said chrominance signal;
C. A first output terminal connected to said first and second demodulator means; and
D. A second output terminal; and
E. Switching means to connect said first or said second input terminals to said first output terminal for one line period, alternately, to produce at said first output terminal said first continuous chrominance signal and to connect said second or said first input terminals to said second output terminal, alternately, to produce said second continuous chrominance signal, said first input terminal being connected to said first output terminal when said second input terminal is connected to said second output terminal, and vice versa.

4. The decoding system of claim 3 in which said first supplying means is connected to said first output terminal and said second supplying means is connected to said second output terminal.

5. The decoding system of claim 4 comprising, in addition, a phase inverter connected in circuit between said second generating means and said second demodulator means whereby said second reference signal supplied to said second demodulator means has a polarity opposite to the polarity of burst signals in said second continuous chrominance signal.

6. The decoding system of claim 5 comprising, in addition, a matrix circuit connected to each of said first and second demodulator means and to a source of said luminance signal components to produce separated primary color signal components.

7. The decoding system of claim 1 comprising, in addition:

A. An adding circuit for adding said first and second reference signals to produce a third reference signal having a phase between the phases of said first and second reference signals; and
B. Means for supplying said first and third reference signals to said first and second demodulator means, respectively.

8. The decoding system of claim 7 in which said first generating means comprises an oscillator having an output signal in phase with the burst signal in said first chrominance signal, said system comprising, in addition, means directly connecting said oscillator to said first demodulator to supply to said first demodulator a reference signal having the same phase as the burst signal in said first continuous chrominance signal.

9. The decoding system of claim 7 comprising, in addition, a phase inverter connected in circuit between said adding circuit means and said second demodulator to reverse the polarity of the first and second reference signals to produce said third reference signal.

10. The decoding system of claim 8 comprising, in addition:

A. A second phase inverter connected to said second generating means; and
B. A second adding circuit connected to said first generating means and to said second phase inverter to add the output signals therefrom, the output of said second adding circuit being connected to said first demodulator means to supply said first reference signal thereto with the proper phase to demodulate one of said chrominance signal components.

11. The decoding system of claim 8 in which:

A. Said first generating means comprises:
   1. a continuous wave generator connected to said first supplying means to be controlled by signals therefrom, and
   2. a first oscillator connected to said continuous wave generator to be controlled thereby to produce an output signal in phase with burst signals in said first continuous chrominance signal; and
B. Said second generating means comprises:
   1. a second continuous wave generator connected to said second supplying means to be controlled by the output signal therefrom, and
   2. a second oscillator connected to said second continuous wave generator to be controlled by the output signal therefrom to produce a signal in phase with burst signals in said second continuous chrominance signal.

12. The decoding system of claim 9 comprising, in addition:

A. A first oscillator connected in circuit between said first-named adding circuit and said first-named phase inverter to be controlled by the output signal of said first-named adding circuit; and B. A second oscillator connected in circuit between said second adding circuit and said second demodulator to be controlled by the output signal of said second adding circuit.

* * * * *